United States Patent
Brennan et al.

[11] Patent Number: 5,956,648
[45] Date of Patent: Sep. 21, 1999

[54] TRUNKED RADIO MONITORING SYSTEM

[75] Inventors: Terence Brennan, Melbourne, Fla.;
Terence Sean Sullivan, Berkeley, Calif.

[73] Assignee: G/Tracker Technologies LLC, Henderson, Nev.

[21] Appl. No.: 08/820,338

[22] Filed: Mar. 12, 1997

[51] Int. Cl.⁶ ...................................................... H04Q 7/00
[52] U.S. Cl. ........................... 455/518; 455/520; 455/521
[58] Field of Search ..................................... 455/518, 519, 455/520, 521, 525, 526, 515, 434, 32.1, 514; 370/330

[56] References Cited

U.S. PATENT DOCUMENTS

| | | | |
|---|---|---|---|
| 4,649,567 | 3/1987 | Childress . | |
| 4,905,302 | 2/1990 | Childress et al. | 455/34 |
| 4,926,496 | 5/1990 | Cole et al. | 455/77 |
| 5,125,102 | 6/1992 | Childress et al. . | |
| 5,179,721 | 1/1993 | Comroe et al. | 455/515 |
| 5,212,724 | 5/1993 | Nazarenko et al. | 455/520 |
| 5,235,598 | 8/1993 | Sasuta | 455/518 |
| 5,404,573 | 4/1995 | Yabe et al. | 455/515 |
| 5,408,680 | 4/1995 | Hattey et al. | 455/15 |
| 5,442,809 | 8/1995 | Diaz et al. | 455/518 |
| 5,471,646 | 11/1995 | Schultz | 455/519 |
| 5,483,670 | 1/1996 | Childress et al. . | |
| 5,526,376 | 6/1996 | Kellenberger et al. | 455/520 |
| 5,613,209 | 3/1997 | Peterson et al. | 455/518 |
| 5,650,995 | 7/1997 | Kent | 455/520 |
| 5,790,527 | 8/1998 | Janky et al. | 370/330 |

*Primary Examiner*—Dwayne D. Bost
*Assistant Examiner*—Jean A. Gelin
*Attorney, Agent, or Firm*—Leydig, Voit & Mayer, Ltd.

[57] ABSTRACT

A method and apparatus for passively monitoring communications in a trunked communication system. Digital messages transmitted over a control channel at a particular frequency are monitored with a receiver. When a first bit pattern is detected in a digital message, subsequently transmitted data is stored. Information is extracted from the stored data to obtain a channel assignment code indicating a frequency over which communications take place and a talk group identification code identifying a talk group in the trunked communication system participating in a communication. If the talk group is a talk group of interest, the receiver is tuned to the frequency corresponding to the channel assignment code so that voice communications are successfully monitored. The receiver is tuned to the control channel after each voice communication so that a communication including multiple transmissions on different frequencies is coherently monitored by retuning the receiver in accordance with the received channel assignment codes. In an alternative embodiment, separate receivers are provided for the control channel and for voice communications. The voice receiver is continually tuned to different working channels in response to talk group and channel assignment codes received by the control channel receiver.

17 Claims, 6 Drawing Sheets

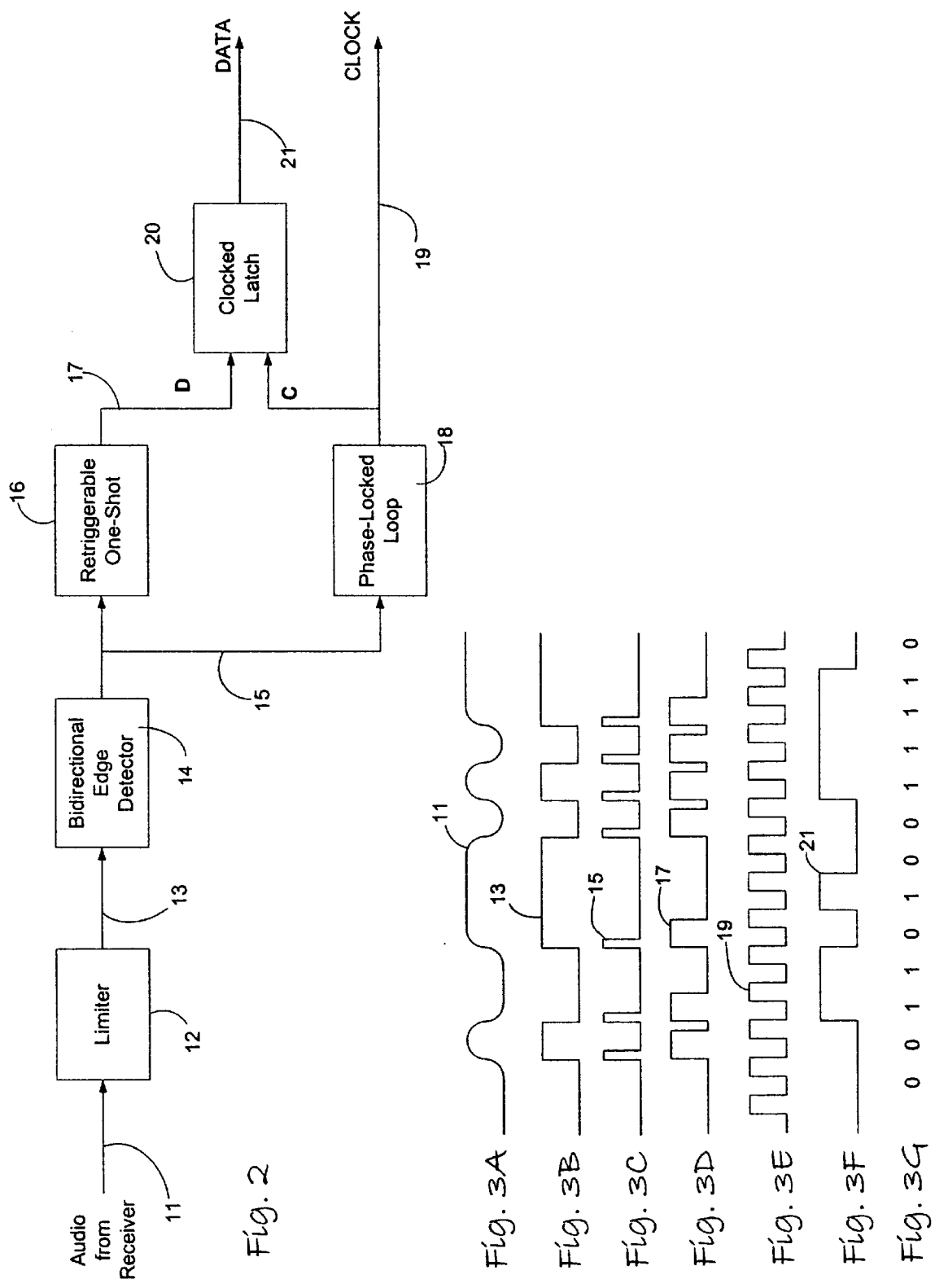

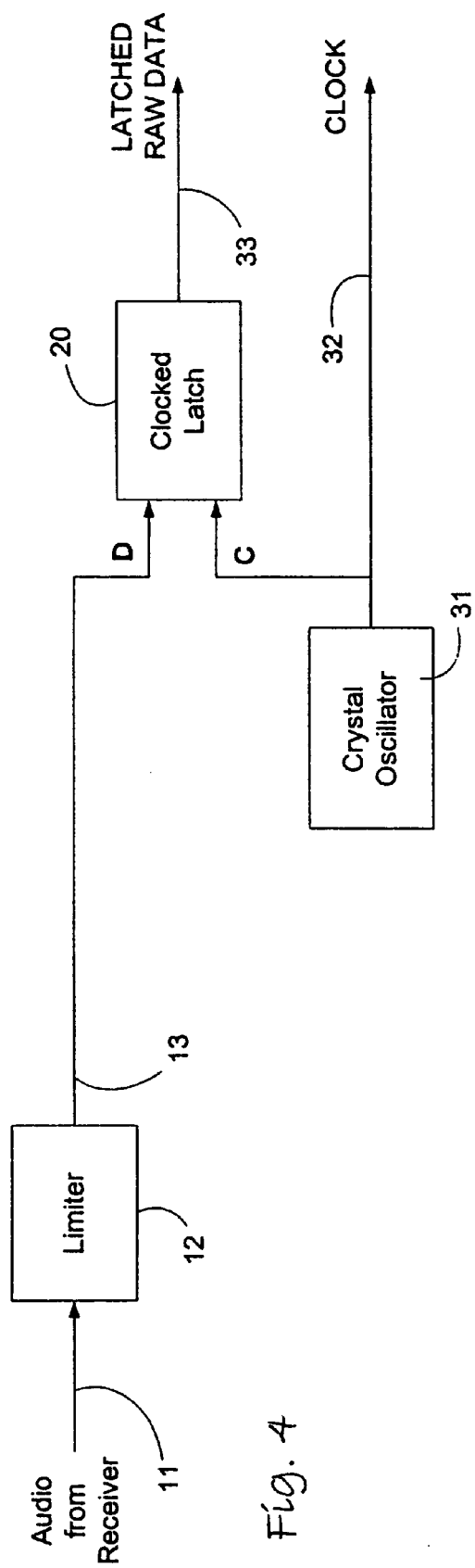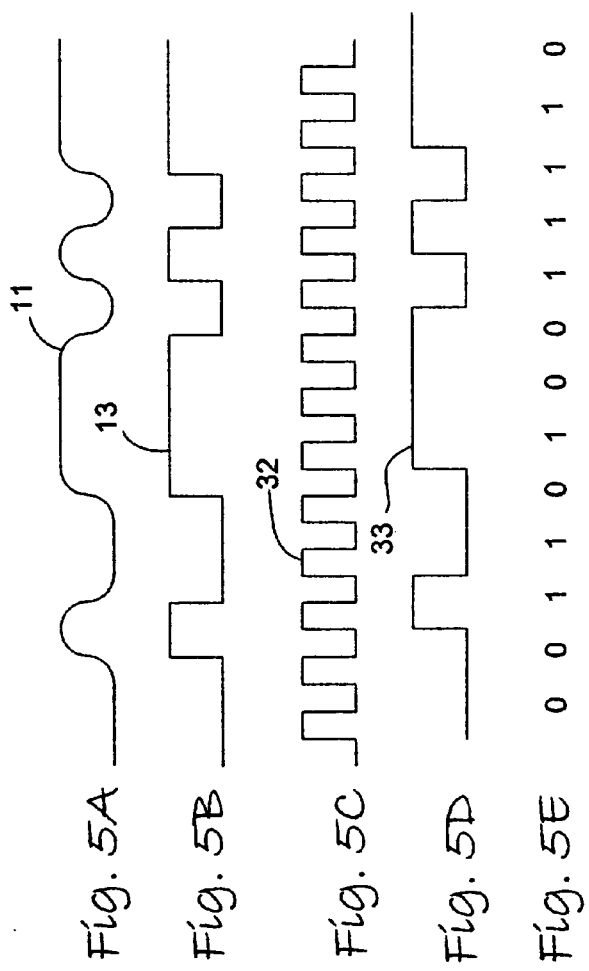

(Part One)

(Part Two)

TRUNKED RADIO MONITORING SYSTEM

TECHNICAL FIELD

The present invention relates to methods and apparatus for monitoring trunked radio communications.

BACKGROUND

In conventional radio frequency communications systems, communication between two parties typically occurs over a preselected channel corresponding to a single operating frequency. For example, a conventional police radio communication system may include multiple mobile transceivers and a stationary central unit at a control site. Each mobile transceiver includes circuitry for transmitting and receiving over a single channel corresponding to a single operating frequency. Alternatively, each mobile transceiver may include a channel selector switch for selecting one of several channels, i.e., frequencies, for communication. However, each communication conventionally occurs over a single frequency.

In a typical communication, a police officer may select a channel on a mobile transceiver (if channel selection is provided), for example 800 MHz, and transmit voice signals at 800 MHz to a dispatcher at the control site. The dispatcher receives the communication and responds by transmitting at 800 MHz or at another fixed frequency to which the mobile transceiver is tuned for receiving. Since the mobile transceiver is tuned to the control site transmission frequency, the police officer hears the response from the dispatcher. The police officer may then reply to the communication from the dispatcher on the selected transmitting frequency. In this manner, communication occurs over a single channel corresponding to a single operating frequency. Alternatively, transmissions from the mobile transceiver and the control site transceiver may occur on two respective frequencies in a duplex operation. Listening to these single frequency or dual frequency transmissions is easily accomplished with a conventional fixed frequency receiver.

In past years, frequency scanning receivers have permitted monitoring of multiple frequency transmissions, particularly on public safety and public service channels. The typical scanning receiver has multiple tuners or an electronically driven tuner so that each locally used frequency can be received, one transmission at a time. The receiver automatically steps from frequency to frequency, i.e., scans, stopping or dwelling on a channel in use until the transmissions on that channel cease. Then, the frequency scanning resumes. Alternatively, the listener may skip or modify scanning to listen to a particular channel even if there are interruptions in transmission on that channel.

In trunked radio communications systems, communications between two parties may occur on multiple channels, i.e., on differing frequencies, for respective transmissions. For example, in a trunked system, a police officer may transmit voice information from a mobile transceiver to the dispatcher at the control site at a first frequency. The dispatcher may respond on a second frequency. The police officer may reply on a third frequency, and so on. Digital signaling between the mobile transceiver and the control site on a separate control channel supplies each unit with the next transmission frequency for tuning both the transmitter and receiver sections of the transceivers.

Conventional scanning radio receivers are unable to monitor communication in a trunked system coherently. Scanning of frequencies in a fixed pattern produces reception of only some of the transmissions of a trunked system. Dwelling on one channel may result in reception of only one transmission of a multiple transmission communication. Thus, a conventional scanning receiver dwelling on a channel cannot reliably indicate the source of the transmission received, e.g., police, fire, rescue, etc. Moreover, since the conventional scanning receiver does not have the ability to receive, decode, and use the digital signaling information, it cannot follow the frequency changes of a particular group of transmissions, i.e., talk group. Therefore, a listener using a conventional scanning receiver can almost never hear a complete conversation in a trunked radio system.

If a conventional scanning receiver tries to monitor a trunked communication, the scanning receiver may receive a first transmission in the communication. However, the scanning receiver is unlikely to receive subsequent transmissions in communications occurring at different frequencies. For example, a scanning receiver may receive a first transmission in the trunked communication at a first frequency. When the first transmission ends, the scanning receiver may resume frequency scanning. The second transmission in the trunked communication occurs at a second frequency. However, instead of receiving that subsequent transmission, the scanning receiver may dwell on a transmission at a third frequency, most likely a transmission from another trunked or non-trunked communication system. Even if the conventional scanning receiver begins frequency scanning after receiving a first transmission and, by accident, dwells on a second frequency where the first communication continues, the scanner may be late in tuning to the second frequency so that part of the second transmission is missed. Thus, a conventional scanning receiver monitoring a trunked transmission may receive interleaved fragments of several unrelated communications from different sources or fragments of one communication.

U.S. Pat. No. 4,905,302 to Childress et al. (hereinafter Childress), the disclosure of which is incorporated by reference, describes an example of a trunked radio communications system. In the Childress system, radios send and receive digital control signals over a dedicated control channel for designating operating frequencies, i.e., working channels, for voice communications. In the Childress system, a radio initiating a communication is referred to as a calling unit. A radio to which a communication is addressed is referred to as a called unit. In order to initiate a communication, a calling unit sends a digital signal referred to as a channel request over the control channel to a control site. The control site responds by transmitting another digital signal referred to here as a channel assignment message over the control channel to the calling unit.

A channel assignment message comprises bit codes that include a channel identification code and a talk group identification code. The channel identification code indicates an assigned working channel over which a voice transmission will occur. The talk group identification code indicates the group of users intended to receive the transmission (the called units).

Once the calling unit receives the channel assignment message with a talk group identification code that matches the talk group identification code of the calling unit, the calling unit tunes to that assigned working channel for transmission and reception. The control site also sends a confirmation message on the assigned working channel. The calling unit responds by sending a verification message to the central unit over the assigned working channel. The central unit responds to the verification message by sending a command over the assigned working channel to "unsquelch" the radios of the called units, i.e., to permit reception of the voice communication. The user of the calling unit then transmits voice information. All of these exchanges are completed before voice communication and are initiated, for example, when the system user first presses the push-to-talk button on the calling unit.

Only the called units having the transmitted talk group identification code are actuated by the "unsquelch", i.e., unmuting, command and receive the transmission. Radios within the system but outside of the called talk group remain muted or tuned to the control channel for receiving other communications. Thus, the only way for a radio within the system to receive a transmission is to have a talk group identification code matching the talk group identification code in the channel assignment message of the digital control signal.

During communications in a trunked system between a calling unit and a control site, the control site continually broadcasts, on the control channel, periodic update messages. The update messages have a similar format with regard to the channel identification and talk group codes as the channel assignment message. However, the channel assignment message is transmitted only once upon initiation of communication over the working channel. The update message is repeatedly transmitted on the control channel during voice communication on the working channel so that transceivers in a talk group communicating on the working channel that are newly turned on, are re-establishing communication after a loss of signal, and the like, can join the talk group communications. These added transceivers join the communications "in progress" based upon detection and decoding of an update message. In this disclosure, references to a message, generically, encompasses both channel assignment messages and update messages.

Communication is terminated when the push-to-talk button on the calling unit is released. When this release occurs, the calling unit transmits an unkeyed message over the assigned working channel to the control site. The control site responds to the unkeyed message by sending a drop signal on the assigned working channel. Upon receiving the drop signal, the calling unit and the called units relinquish the assigned working channel and are tuned to monitor the control channel.

The process described is repeated for subsequent transmissions. For example, if a called unit responds to the first transmission from the first calling unit, the called unit becomes a calling unit and transmits a channel request to the control site on the control channel. The control site then assigns a working channel that may be different from the assigned working channel for the previous transmission. Because of the changes in frequencies, monitoring communication in a trunked system as described by Childress with a conventional scanning receiver is impossible for the reasons previously detailed.

In the Childress system, participating transceivers utilize complex bit codes and handshaking protocols. For example, communications over the control channel are synchronized using synchronization bit patterns preceding each transmission. Accordingly, mobile transceivers must include pattern recognition circuitry for recognizing these synchronization patterns.

Numerous other bit codes are also transmitted on the control channel in the system described by Childress. For example, a calling identification code may be included in each channel request signal on the control channel for identifying the specific calling transceiver. The calling identification code may also be included in the channel assignment messages. By using the calling identification code, the working channel assignment may include a command that enables only the calling transceiver to transmit on the assigned working channel. In that system, each mobile unit must include circuitry for transmitting and recognizing its identification code.

Another bit code transmitted on the control channel is a message code indicating whether the call is message trunked or transmission trunked. A third code may be a communication code indicating whether the call is to an individual radio or a group of radios. Individual radios in the Childress system must recognize and respond to each of these codes in order to communicate in the system.

In addition to transmitting bit codes over the control channel, the Childress system also transmits sub-audible data over the assigned working channel. This sub-audible data enables a higher priority communication to interrupt a lower priority communication that is in progress on an assigned working channel. Accordingly, transceivers participating in that system must include circuitry for detecting sub-audible data.

While the sophisticated trunked communication system has many operational advantages, monitoring trunked communications has required a complex trunked system transceiver and, therefore, has been expensive and lacking in flexibility. Further, conventional trunked system transceivers are arranged only to detect certain communications, under circumscribed conditions, and are restricted to a limited number of talk groups. Accordingly, there is a need for a simple receiver for passively monitoring a trunked radio communications system so that communications can be coherently monitored even when the frequencies of transmission change.

SUMMARY OF THE INVENTION

An object of the present invention is to provide a trunked radio monitoring system.

A further object of the present invention is to provide a method for monitoring a trunked radio communication.

Another object of the present invention is to provide an apparatus for monitoring trunked radio communications that is simple in design.

A method of monitoring communications in a trunked communication system according to the invention includes, with a frequency tunable receiver, monitoring digital messages on a control channel to detect a first bit pattern in the digital messages; upon detection of the first bit pattern in a digital message, storing data subsequently transmitted on the control channel; extracting information from the stored data and analyzing the extracted information to obtain a channel assignment code and a talk group identification code; comparing the talk group identification code obtained from the stored data to talk group identification codes of interest and, if the talk group identification code obtained from the stored data is a talk group identification code of interest, tuning the receiver to a working channel corresponding to the channel assignment code obtained from the stored data; and monitoring voice transmissions on the working channel.

An apparatus for monitoring communications in a trunked communication system according to the invention includes a receiver tunable in frequency for monitoring digital messages on a control channel and voice communications on a plurality of working channels; a demodulator for demodulating the digital messages received by the receiver on the control channel and producing demodulated signals; a detector for detecting a first bit pattern in the demodulated signals;

a first memory for storing demodulated signals transmitted on the control channel subsequent to transmission of the first bit pattern; analyzing means for extracting information from demodulated signals stored in the first memory to obtain a channel assignment code and a talk group identification code; a second memory for storing talk group identification codes of interest; comparing means for comparing the talk group identification code obtained from the demodulated signals stored in the first memory to the talk group identification codes of interest stored in the second memory and for generating an indication if the talk group identification code obtained from the demodulated signals stored in the first memory matches a talk group identification code of interest; and tuning means for tuning the receiver to a working channel corresponding to the channel assignment code extracted from the demodulated signals stored in the first memory when the comparing means indicates that the talk group identification code extracted from the demodulated signals stored in the first memory is a talk group identification code of interest.

Another method of monitoring communications in a trunked communications system according to the invention includes, with a frequency tunable control channel receiver, monitoring digital messages on a control channel to detect a first bit pattern in the digital messages; upon initial detection of the first bit pattern in a digital message, storing data subsequently transmitted on the control channel; extracting information from the stored data and analyzing the extracted information to obtain a channel assignment code and a talk group identification code from the stored data; comparing the talk group identification code obtained from the stored data to a prioritized list of talk group identification codes of interest and, if the talk group identification code obtained from the stored data is a talk group identification code of interest, tuning a voice channel receiver to a working channel corresponding to the channel assignment code and monitoring subsequent voice transmissions; storing the talk group identification code of the working channel to which the voice channel receiver is tuned as the stored talk group identification code; while monitoring voice transmissions with the voice channel receiver, continuing to monitor with the control channel receiver digital messages on the control channel for detecting the first bit pattern; while monitoring voice transmissions with the voice channel receiver, upon detecting with the control channel receiver the first bit pattern in a digital message, storing data subsequently transmitted on the control channel; extracting information from the stored data and analyzing the extracted information to obtain a new channel assignment code and a new talk group identification code from the stored data, comparing the new talk group identification code to the prioritized list of talk group identification codes of interest and to the stored talk group identification code and, if the new talk group identification code is a talk group identification code of interest and has a higher priority than the stored talk group identification code, tuning the voice channel receiver to the working channel corresponding to the new channel assignment code and storing the new talk group identification code as the stored talk group identification code; and monitoring voice transmissions with the voice channel receiver tuned to the working channel corresponding to the new channel assignment code while continuing to monitor the digital transmissions on the control channel with the control channel receiver for the first bit pattern.

An alternative apparatus for monitoring communications in a trunked communication system according to the invention includes a control channel receiver tunable in frequency for monitoring digital messages on a control channel; a voice channel receiver tunable in frequency for monitoring voice communications on a plurality of working channels, a demodulator for demodulating the digital messages received by the control channel receiver on the control channel and producing demodulating signals; a detector for detecting a first bit pattern in the demodulated signals; a first memory for storing demodulated signals transmitted on the control channel subsequent to transmission of the first bit pattern; analyzing means for extracting information from demodulated signals stored in the first memory and to obtain a channel assignment code and a talk group identification code from the demodulated signals stored in the first memory; a second memory for storing talk group identification codes of interest; comparing means for comparing the talk group identification code obtained from the demodulated signals stored in the first memory to the talk group of identification codes of interest stored in the second memory and for generating an indication if the talk group identification code obtained from the demodulated signals stored in the first memory matches a talk group identification code of interest; and first tuning means for tuning the voice channel receiver to a working channel corresponding to the channel assignment code extracted from the demodulated signals stored in the first memory when the comparing means indicates that the talk group identification code obtained from the demodulated signals stored in the first memory is a talk group identification code of interest.

BRIEF DESCRIPTION OF THE DRAWINGS

FIG. 2 is a block diagram of the demodulator circuit of FIG. 1 according to one embodiment of the invention.

FIGS. 3A–3F are timing diagrams of signals in the circuit of FIG. 2 and FIG. 3G indicates the bit stream of a decoded signal.

FIG. 4 is a block diagram of an alternative embodiment of the demodulator circuit of FIG. 1.

FIGS. 5A–5D are timing diagrams of signals in the circuit of FIG. 4 and FIG. 5E indicates the bit stream of a decoded signal.

In all figures, the same elements are given the same reference numerals.

DETAILED DESCRIPTION OF THE PREFERRED EMBODIMENTS

Figure 1:
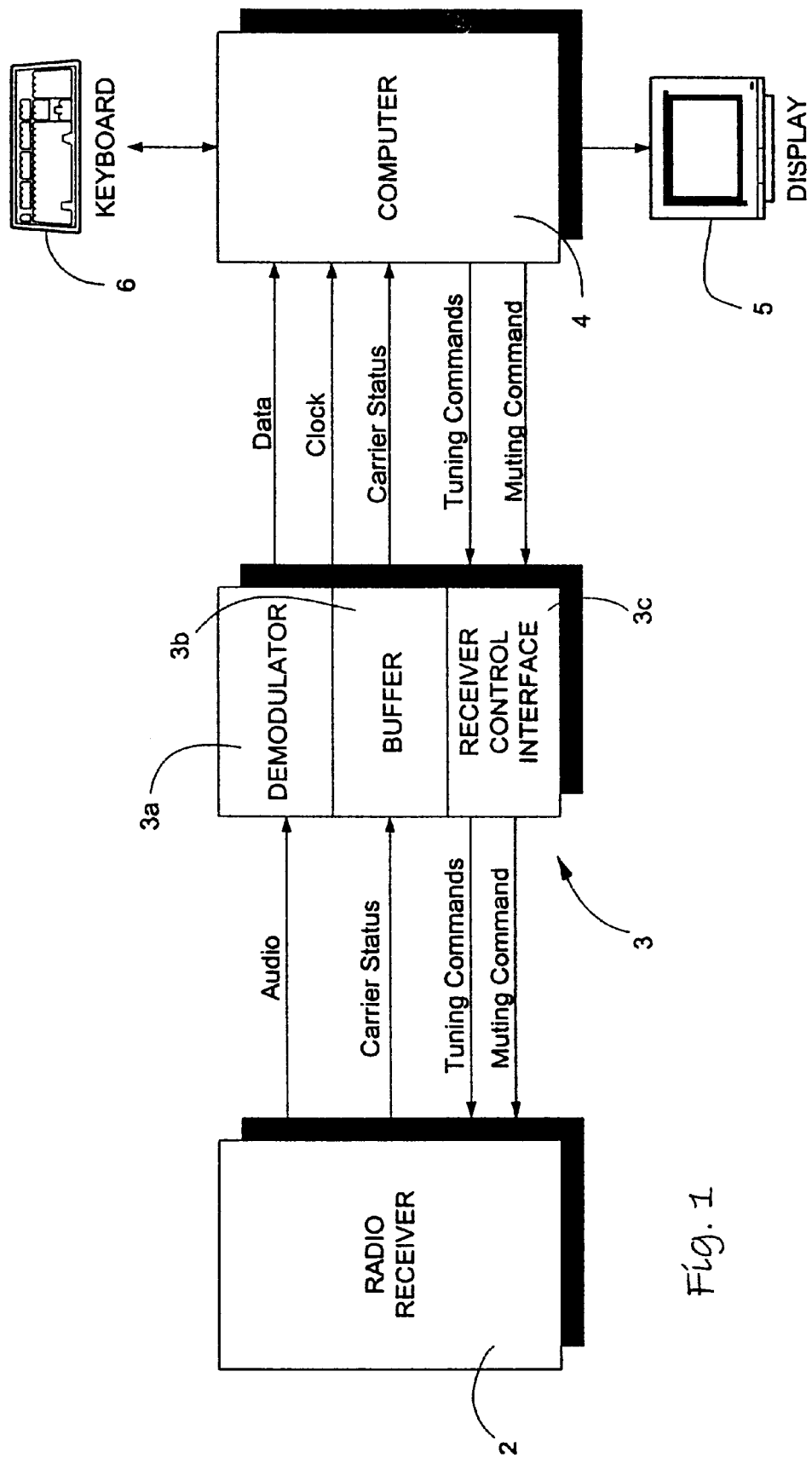
FIG. 1 is a block diagram of a trunked radio monitoring apparatus according to an embodiment of the invention.

FIG. 1 illustrates a trunked radio monitoring apparatus according to an embodiment of the invention that includes a radio receiver 2, interface circuits 3, a computer 4 including an optional display 5, such as a cathode ray tube or liquid crystal display panel, and a keyboard 6. The embodiment described monitors a GE/Ericsson EDACS trunked radio communications system (hereinafter, the GE/Ericsson system). The GE/Ericsson system includes many of the same signaling protocols described in the Childress patent. However, the invention is not limited to monitoring the GE/Ericsson system. A person having ordinary skill in the art will recognize that minor modifications may be made to embodiments of the invention described here for monitoring other trunked communications.

The radio receiver 2 may be any conventional receiver for receiving RF transmissions and that is programmably tuned or otherwise electronically controllably tunable in frequency. An example of such a radio receiver that may be used in a receiver according to the invention is a Yaesu FRG9600 receiver. The Yaesu 9600 can be externally tuned and muted via a receiver control interface 3c, which is part of interface circuits 3, and may be controlled electronically or manually. Through the receiver control interface 3c, a computer 4 controls the tuning of the receiver 2. The receiver control interface 3c may be internal or external to the receiver 2.

The interface circuits 3 include a buffer 3b for level shifting between the computer 4 and the receiver 2. The computer 4 accesses the carrier signal status information in the buffer 3b to determine the presence or absence of a received carrier signal at the receiver. The interface circuits 3 include a demodulator 3a receiving an audio signal from the receiver 2 for converting the audio signal into data processable by logic devices.

FIG. 2 shows one embodiment of a demodulator 3a, a synchronous demodulator, according to the invention. A synchronous demodulator according to this embodiment separates clock and data signals from an incoming data stream and outputs a clock and a data signal synchronized with an input signal.

The demodulator 3a of FIGS. 1 and 2 receives an audio signal 11 from the receiver 2. The audio signal 11 may be digital control channel data from a trunked radio communications system or audio from such a system, or a combination of digital data and audio, depending on the tuning of the receiver 2 and the content of the signal on the channel being monitored. An example of such an input signal is illustrated in FIG. 3A. A limiter 12 limits the amplitude of the audio signal 11 and produces a conditioned signal 13 for logical processing. An exemplary conditioned signal, based on the audio signal 11 of FIG. 3A is shown in FIG. 3B. A bi-directional edge detector 14 receives the conditioned signal 13 and outputs a pulsed signal 15 that includes a short pulse at each bit transition in the input data stream, i.e., in the conditioned signal 13. The conditioned signal 13 of FIG. 3B, after detection, has the waveform of FIG. 3C. A retriggerable one shot multivibrator 16 stretches the pulses of the pulsed signal 15 output from the edge trigger to a duration of about ⅔ of a bit width. FIG. 3D shows an exemplary stretched signal 17.

A phase locked loop 18 receives the pulsed signal 15 output from the edge detector 14 and outputs a clock signal 19 synchronized with the input clock as shown in FIG. 3E. In a preferred embodiment, the phase locked loop 18 derives a 9600 bps clock from the input waveform. The preferred clock rate is 9600 bps because the control channel data rate on the GE/Ericsson system is 9600 bps. However, other data rates may be used, depending on the data rate of the control channel being monitored.

Using the phase locked loop 18 to derive the clock 19 from the input waveform eliminates circuitry for detecting synchronization bit patterns. Therefore, embodiments of the present invention can synchronize with input control channel signals without the pattern recognition circuitry included in the mobile units in the GE/Ericsson system.

A clocked latch 20 receives the clock 19 from the phase locked loop 18 and the stretched signal 17 from the one shot multivibrator 16. The clocked latch 20 outputs to the computer 4 a data signal 21 that is synchronized with the input data waveform. An example of such a waveform is shown in FIG. 3F.

In this method of demodulation, a "1" is output when the input waveform has a transition occurring between successive clock pulses and a "0" is output when there is no transition of the input waveform between successive clock pulses. The data output from the demodulator 3a is preferably in unipolar NRZ format, i.e., a zero is represented by a low signal and a one is represented by a high signal. The decoded signal obtained from the input waveform of FIG. 3A is shown in FIG. 3G. However, the present invention is not limited to the demodulation scheme of FIG. 2. Different demodulation schemes may be used depending on the format of the input data waveform.

FIG. 4 illustrates a simplified demodulator including an asynchronous sampling circuit that may be used in the invention. The edge detector 14 and the one shot multivibrator 16 of the synchronous demodulator of FIG. 2 are omitted. The phase locked loop 18 of the synchronous demodulator is replaced by an oscillator 31. However, the limiter 12 is still employed to produce the conditioned signal 13.

In the demodulator of FIG. 4, the limiter 12 conditions and limits the input data waveform from the receiver 2. The oscillator 31 generates a clock 32 for sampling the input data waveform. The clocked latch 20 receives the clock 32 and the conditioned signal 13 and outputs an output data signal 33 to the computer 4 for analysis. FIGS. 5A, 5B, and 5C depict the timing relationships of the signals 13, 32, and 33, respectively, for an example of an audio input signal 11 shown in FIG. 5A. FIG. 5E indicates the decoded signal.

In a preferred embodiment, the frequency, i.e., sampling rate of the oscillator 31 is 9600 bps. Because the oscillator 31 may not be synchronized with the input data waveform, errors may be present in the output from the demodulator; i.e., the sampled waveform may not include all of the transitions of the input waveform. However, because transmissions in a trunked radio communications system are typically redundant, error correction circuitry may be included to correct errors that may occur.

The computer 4 receives the clock and data outputs from the demodulator 3a. The computer 4 executes a control program, analyzes and decodes the data, and sends tuning and muting commands to the receiver 2. The computer 4 may be coupled to the interface circuits 3 and the receiver 2 via a serial port of the computer. The computer 4 preferably includes a display 5 and a keyboard 6 for controlling system functions. Memory requirements are minimal since the control program may be written in assembly language and is ordinarily only a few thousand bytes in length.

Although the illustrated embodiment depicts a computer 4 controlled by a program, the invention may be implemented by any device capable of decoding data and sending commands to the receiver 2. For example, an electrical circuit including logic devices performing all of the desired functions may be used to implement the invention. The electrical circuit may be integrated with or separate from the receiver 2.

Figure 6:
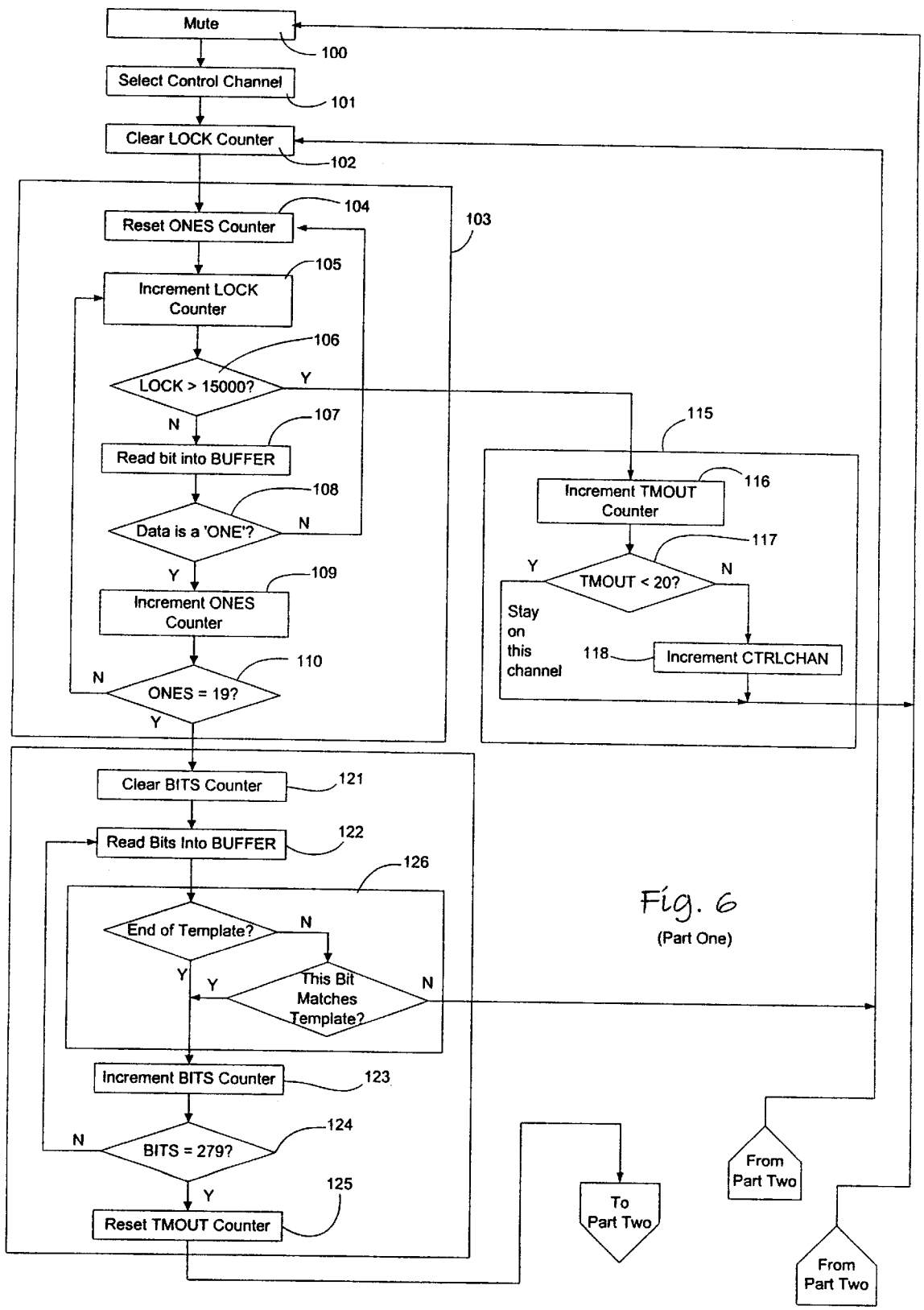
FIG. 6 is a flow chart depicting the operation of a receiver according to an embodiment of the invention.
Figure 6:
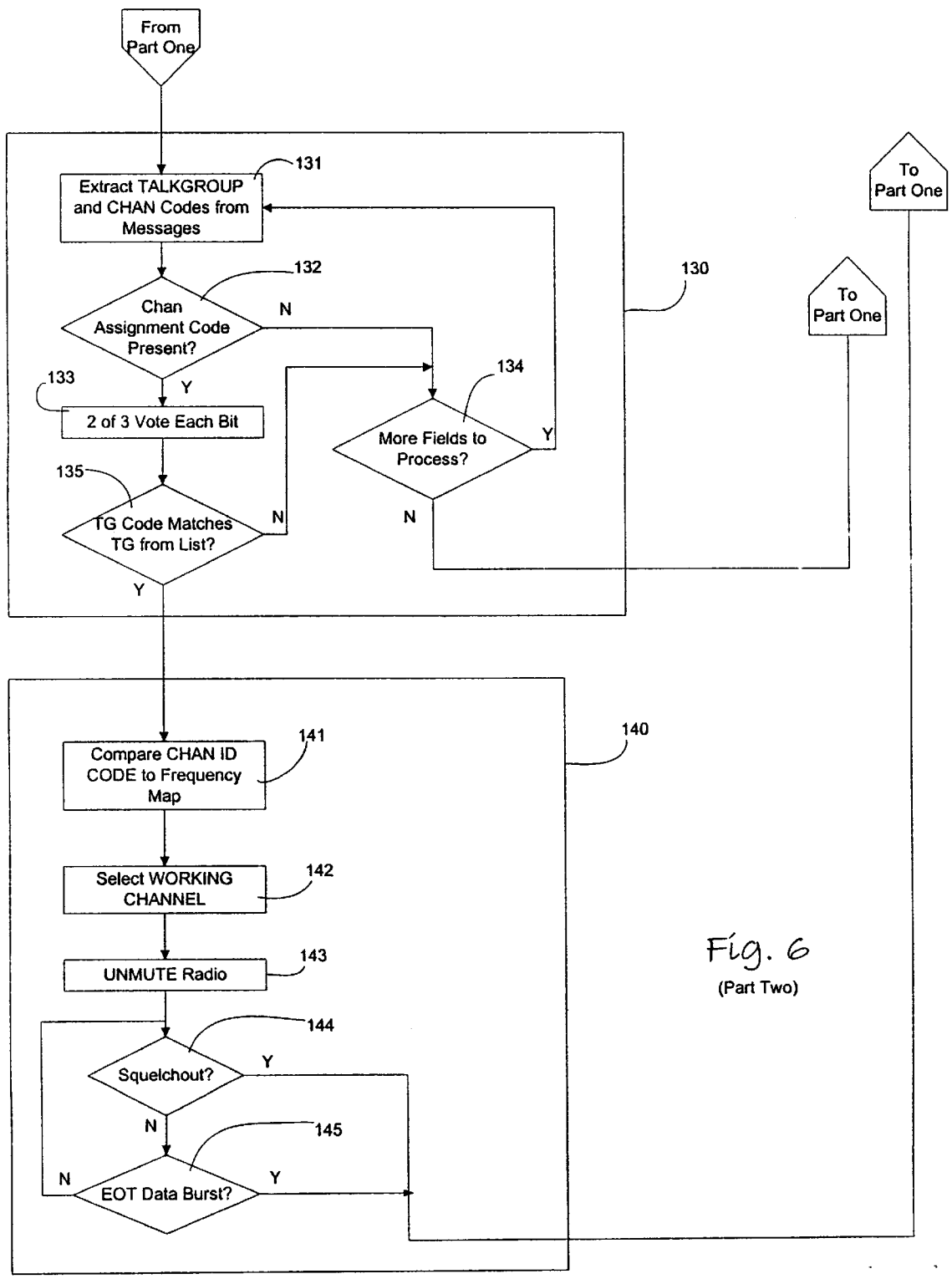

FIG. 6 is a flow chart of the operation of an apparatus according to the invention. In the illustrated embodiment, control channel data of the GE/Ericsson system is decoded. However, other trunked system control channels may be decoded within the scope of the invention.

According to the flow chart of FIG. 6, when the receiver 2 is not monitoring a voice transmission, the receiver 2 is muted (step 100). When the user desires to begin monitoring a trunked transmission, the receiver 2 is tuned to a default control channel frequency (step 101). The control channel frequency may be publicly available information, may be determined manually by a user, or may be automatically determined, as described below.

The control channel is monitored to obtain information so that the monitoring system according to the invention can follow frequency changes in a trunked communication. In the illustrated embodiment, control channel data is decoded to obtain working channel assignments, i.e., frequency and talk group identification codes for monitoring trunked communications of particular talk groups. For monitoring a system other than the GE/Ericsson system, the decoding is modified to extract equivalent bit codes, i.e., codes that contain talk group and working channel information for the communicating parties. Thus, even though the terms "channel assignment code" and "talk group identification code" are used here, the present invention is intended to include decoding of equivalent codes used in other systems.

In the GE/Ericsson system, talk group and channel identification codes are included in a channel assignment message sent to a called unit just before or just as a calling unit initiates a voice transmission and in update messages that are continually transmitted on the control channel during communication within a talk group on an assigned working channel. Following transmission of a channel assignment message, but not an update message, a brief, single handshaking transmission is transmitted. However, that handshaking information is not sought nor used in the described embodiments of the invention. By intercepting the channel assignment message or, more likely, one of the continually transmitted update messages, the present invention obtains working channel and talk group identification codes.

Channel assignment and update messages are always preceded by markers, i.e., specific code identification bit patterns. These code identifier bit patterns are necessary in a trunked communication for the system transceivers to detect that essential coded information is being transmitted afterward, e.g., channel assignment and talk group identification codes, so that the transceiver properly detects and decodes that information. In the illustrated embodiment, the program monitors the control channel until a code identifier bit pattern is detected. In the GE/Ericsson system, the code identifier is an uninterrupted sequence of nineteen ones. That bit pattern is identified in a received control channel signal either by software or hardware, e.g., a shift register, read only memory, and multiple bit comparator. When there is a match between a marker, i.e., a bit pattern, regardless of the system's marker format, that is stored in the receiver according to the invention, and the received control channel signal, storage of subsequent bits of the digital control channel signal takes place.

In FIG. 6, an exemplary embodiment of a process for locating a marker, i.e., the specific bit code, for the GE/Ericsson system is, for convenience, shown within the block 103. The process illustrated employs two counters, a LOCK counter employed for identifying loss of communication on the control channel or incorrect control channel tuning and a counter for counting the number of "one" bits, referred to as a ONES counter. Initially, in step 102, the LOCK counter is reset to zero. Upon entering block 103, the ONES counter is reset to zero at step 104. In step 105, the LOCK counter is incremented and in the test 106, the contents of the LOCK counter are tested against a value, previously established, so that the process described for block 103 is not endlessly repeated without success. In a particular example, the value against which the contents of the LOCK counter are compared is 15,000. Assuming there is no overflow at test 106, in step 107 a bit from the decoded signal of the control channel is read into a buffer. Then, in test 108, a determination is made as to whether that bit is a one. If that bit is a one, indicating a potential for detecting the marker used in the GE/Ericsson system, the ONES counter is incremented at step 109. If the data bit is not a one, indicating that a GE/Ericsson system marker is not being detected, then the process returns to step 104. In that event, the next bit of a decoded signal from the control channel is then tested in the sequence just described in steps 104 though 108. If a bit is determined to be a one and the ONES counter is incremented at step 109, then the test 110 is applied to determine whether nineteen consecutive ones have been detected. If nineteen bits have not yet been detected, then the process returns to step 105 so that subsequent bits can be tested in an attempt to identify a marker that is, in this example, nineteen consecutive ones. If, at test 110, nineteen consecutive ones have been identified so that a marker preceding a channel assignment or update message has been identified, then the process leaves block 103 and proceeds to subsequent steps for extracting further information from the channel assignment message as described below.

If, in step 106, the contents of the LOCK counter exceed the predetermined maximum value, indicating an excessive number of executions of the loop including steps 105–110 in the process of block 103 without the identification of a marker, the process is diverted to block 115. Within block 115, in an initial step 116, a TMOUT counter is incremented. This time-out counter TMOUT counts the number of failures of the process in block 103 to identify a marker after a large number of loop processes in that block 103. If a value of the time-out counter exceeds some threshold, for example, twenty, as determined in the test 117, then it is concluded that the receiver is not tuned to an active control channel. In that event, a command is generated in step 118 to change the control channel tuning to the next frequency according to a predetermined list. The list may simply be a list of frequencies with particular increments and arranged in ascending or descending order or may be a prioritized list based upon known frequencies that are used in a particular communications system or geographic area. Then, the command generated in step 118 is supplied to step 101 where the control channel tuning is changed and the process of block 103 is commenced again. If, however, in the test 117 the value in the TMOUT counter is less than the threshold, then it is presumed that the control channel tuning is correct and the process reverts to step 101 without a command to change the control channel. This feature of providing multiple opportunities for failure of the loop including steps 105–110 in block 103 without retuning of the control channel causes the system to resume monitoring rapidly in the event of an upset, such as a disruption of power to the receiver 2. Since the receiver is preferably electronically tuned, the command supplied to the receiver in step 101 is a tuning command that causes the receiver to be retuned to the same control channel frequency previously employed.

Alternatively, the steps just described may be employed for automatically finding the active control channel frequency. Initially, in step 101, the receiver is set to an arbitrary system frequency and then the steps at blocks 103 and 115 are repeated until the receiver is tuned to an active control channel so that nineteen ones, in the GE/Ericsson system, are ultimately identified in test 110.

After identification of the marker, i.e., the code identifier bit pattern, then the following bits of the channel assignment or update message are stored for subsequent data processing. These steps are illustrated within the block 120 of FIG. 6. Initially, a BITS counter is reset to zero in order to count the number of bits including and following the code identifier bit pattern that are to be stored. Each bit is serially read into a buffer in step 122. Thereafter, unless an optional process described below is carried out, the BITS counter is increased for each received bit in step 123. In test 124, the number of bits read in is compared to the number of bits desired to be stored. In the GE/Ericsson system, for example, it may be desirable to store two hundred seventy-nine bits of the channel assignment message following the nineteen bit marker. If all of the desired number of bits have not yet been read in, then the test 124 returns to step 122 for the reading in process to continue. Once the desired number of bits have been read in, as indicated by test 124, then the TMOUT counter is reset in step 125. The TMOUT counter is the counter employed in step 116 of block 115, previously described. Then, the process exits from block 120 to the next major process of extracting talk group and channel assignment information from the stored data.

In some trunked communication systems there may be additional bit patterns having a fixed format. For example, in the GE/Ericsson system, the next twenty-six bits after the marker, i.e., the code identifier bit pattern, have a particular format that may be compared to a template for error checking. When the format of data in a particular trunked communication system provides an opportunity for this kind of error checking, a process, such as the process indicated in block 126 within block 120 may be carried out. As indicated in test 127, the number of bits read in is subjected to a secondary count for comparison to a template. At each bit before the end of the template, in test 128, a comparison is made between the expected value of the bit depending upon its location in the sequence and the template. If the detected bit is correct, according to this comparison in test 128, the process proceeds to step 123. If the test 128 shows disagreement, for example because of fading in the received signal, then the process exits blocks 126 and 120 and reverts to step 102. Then the entire process of block 103 begins again and continues until a sufficiently strong signal is detected, assuring that both the code identifier pattern and the subsequently transmitted second bit pattern that are present in a particular trunked communication system are accurately received.

Once the control channel is located and the code identifier bit pattern has been successfully detected and data received on the control channel (e.g., the two hundred seventy-nine bits containing the channel assignment and talk group identification codes) is stored at step 125. After step 125, analysis of the stored data begins in block 130. The stored data are analyzed by extracting information from specific locations to determine if a channel assignment code is present. If a channel assignment code is present, then the process continues; otherwise, if all sources of channel assignment codes in the stored data are exhausted without identifying a channel assignment code, the process reverts to step 102.

In the GE/Ericsson system, the channel assignment code is a five bit sequence appearing at a specific location in a data structure in relation to the marker (the first specific bit pattern) that initiates a channel assignment or update message, and the talk group identification code is an eleven bit code appearing at a second specific location in the data structure. For example, in the GE/Ericsson system as described in the Childress patent, the channel assignment code is located at bits 12–16 in a channel assignment, and the talk group identification code is located at bits 17–28 in the channel assignment. Other trunked communications systems may use different length codes in different locations in a data structure. In a receiver according to the invention, working with a non-GE/Ericsson system, the locations of the channel assignment and talk group identification codes are known and putative codes are extracted from the stored control channel data in an analogous manner.

In the GE/Ericsson system, the control channel data structure includes many other bit codes, for example, individual radio identification codes. However, in the invention, only the channel assignment code and the talk group identification code need to be extracted from the stored data. In this manner, the present invention avoids unnecessary complexity in decoding circuitry and/or steps, yet extracts sufficient information from the control channel to follow a trunked communication as the frequency of a specific communication changes. In non-GE/Ericsson systems, the channel assignment and talk group identification codes are similarly extracted by knowing their lengths and positions within an information frame that is part of the stored data.

A process of extracting channel assignment and talk group identification codes from stored data is illustrated in block 130 of FIG. 6. Initially, in step 131, information is extracted from two different locations within the stored data in an attempt to identify channel assignment and talk group identification codes. In test 132, a determination is made as to whether the extracted information has the form of a channel assignment code.

If the form is proper, then optional error correcting steps for checking the accuracy of the channel assignment code may be carried out. For example, in the GE/Ericsson system, channel assignment and talk group identification codes are transmitted with three-fold redundancy. Data is extracted from each of the three locations in an information frame where the channel assignment codes should be located. For each of the three putative channel assignment codes, if at least two of the three extracted codes for the channel assignment code and two of the three extracted codes for the group identification code match on a bit-by-bit comparison basis at step 133, the process continues. The third or non-matching channel assignment code is rejected and the process moves to step 135 using the matching codes. As an alternative error checking procedure, a three-fold match of codes instead of step 133 may be required for a valid code extraction. Then, the process of FIG. 6 proceeds to step 135. If there is no three-fold match in this alternative, the process may reject all of the extracted channel assignment codes and talk group identification codes and return to step 103 through step 134. As a further alternative, the channel assignment and update messages can include a BCH check word that can be analyzed to check for and, possibly, correct errors. While error detection and correction is preferred, there is no requirement that a system according to the invention include any error checking code or step.

If at test 132 the information extracted from the stored data does not have the proper form of a channel assignment code, then a further test is made at test 134 to determine whether there are other fields within the stored data from which channel assignment codes can be extracted. In other words, all data blocks within the stored data are exhausted before the data extraction process is abandoned. If there are more fields to check, then the process reverts to step 131. If all fields within the stored data that may contain channel assignment codes and talk group identification codes have been exhausted, then test 134 reverts to step 102 of the process of FIG. 6.

In test 135, the extracted talk group identification code is compared to a list of talk group identification codes of interest stored in a memory to determine whether to monitor a communication. Each talk group has a unique talk group identification code. For example, the police may have a talk group identification code of 00011001101. Thus, every channel assignment and update message addressed to a police transceiver would contain the talk group identification code 00011001101 and all transmissions except those addressed to talk group 00011001101 would be ignored by police transceivers. The extracted talk group identification code is compared to the stored list of groups of interest. If there is a match at test 135, then the channel assignment code is used to tune the receiver to receive the communication of the identified talk group of interest, as described below. If no talk group identification code of interest is detected at test 135, the process returns to step 134. If more fields remain in the stored data for extraction, then the process of block 130 is repeated. For example, in the GE/Ericsson system, two update messages may be sent together, sequentially. Test 134 ensures that both messages have all possible codes extracted so that if the first message does not produce a channel assignment code or if no talk group identification code of interest is found in the first message, the same codes are sought in the second message. If all fields of interest in the stored data have already been extracted, then the process returns to step 102.

A user may develop a list of talk group identification codes manually by monitoring the content of transmissions using a conventional scanning receiver while monitoring the control channel with a receiver according to the present invention that displays talk group codes. For example, if a receiver according to the present invention detects a channel assignment including a talk group identification code of 00011001101, and the channel assignment is immediately followed by a voice transmission with police information, such as the user hears on a conventional scanning receiver, is the user may determine that the talk group identification code 00011001101 corresponds to a law enforcement agency. Alternatively, talk group identification code data may be publicly available. Once the user determines a list of talk group identification codes, one or more codes may be specified and stored, through and in the computer 4, identifying the talk groups of interest so that their communications can be received.

If the talk group identification code extracted from the control channel data indicates a desired code (i.e., a code for one of the groups that the user desires to monitor), the process of FIG. 6 moves to block 140 to begin receiving a voice transmission. In order to determine the frequency at which the voice transmission will occur, in step 141 the channel assignment code is compared to a frequency map. The frequency map contains a list of channel assignment codes and a corresponding operating frequency for each channel assignment code. The frequency map may be produced automatically by the computer or manually by a user. An operating frequency can be paired with a channel assignment code without monitoring the content of a voice transmission. For example, a user may monitor the control channel until a channel assignment code is detected. The user may then monitor a transmission and determine its frequency using a conventional scanning receiver. The frequency at which the transmission occurs is the operating frequency corresponding to that channel assignment code. The user manually pairs the frequencies and the channel assignment codes. Alternatively, the receiver may monitor the activity patterns on the channels of a trunked communication system and subsequent voice transmissions on the working channels of the system and develop the frequency map automatically. Further, the GE/Ericsson system may periodically transmit, on the control channel, information giving the relationship between system channel numbers and FCC frequency codes. That information, i.e., the frequency map, may be received and recorded as a further alternative for constructing the frequency map automatically Once the channel assignment code is extracted and the corresponding frequency determined via the frequency map, the receiver 2 is tuned to that frequency at step 142 and an unmute command is sent to the receiver at step 143 to enable the user to hear a voice transmission. Although the process of detecting the first bit pattern data, storage, and data extraction and analysis may seem to require many steps, the process occurs very quickly. Thus, the receiver 2 is rapidly retuned from the control channel to the assigned working channel and there is little or no loss of the voice communication of the talk group being monitored.

The receiver 2 monitors a voice transmission until there is a loss of carrier or end-of-transmission data burst indicating the end of a transmission. A loss of carrier may be caused by a loss of communication due to obscuring of the communication path by a natural or man-made object, or by some other factor. This loss of carrier effectively ends the transmission, requiring a new working channel assignment. Thus, upon a determination that the signal is lost, the process reverts from block 140 to step 100 as shown in FIG. 6. In block 140 of FIG. 6, loss of carrier is equivalent to "squelch out" of test 144. As long as the carrier is present, the process continues to test 145 which monitors for an end-of-transmission (EOT) data burst. These two tests continue in an endless loop until either the carrier is lost or the end-of-transmission data burst is received. Upon the occurrence of either event, the process returns to step 100 of FIG. 6.

An end-of-transmission data burst is sent by the system on the working frequency indicating the end of a voice transmission when the calling unit unkeys. In a preferred embodiment of the present invention, a voice transmission is monitored until a third bit pattern is received, the end-of-transmission data burst indicating the end of that transmission. In the GE/Ericsson system, the third bit pattern is a sequence of nineteen consecutive ones transmitted on the assigned working channel and detected in test 145 using a process similar to that of block 103 without step 105 and test 106.

Figure 7:
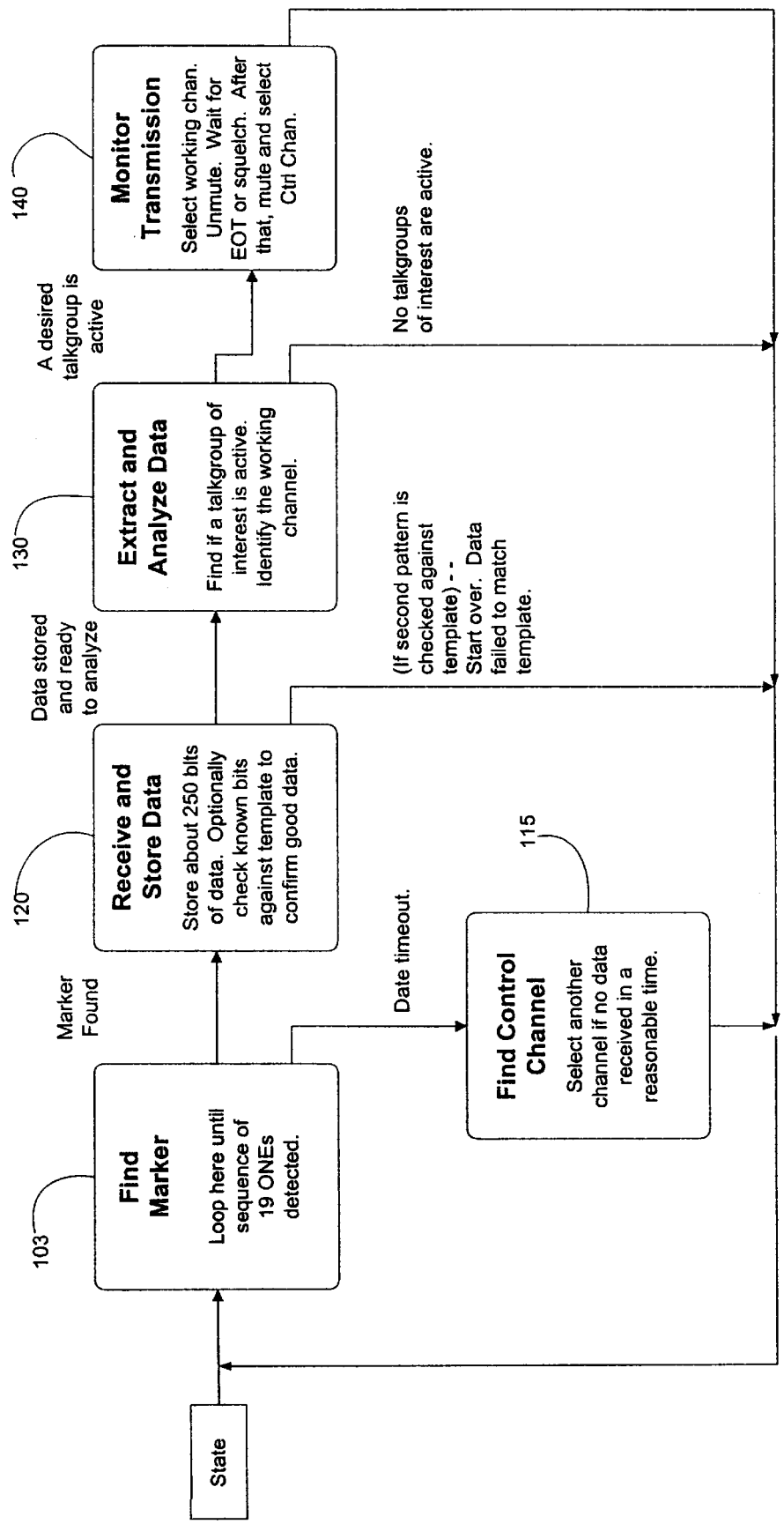
FIG. 7 is a flow chart summarizing the process of FIG. 6.

Once the receiver/computer detects either a loss of carrier or an end-of-transmission data burst, the receiver is muted at step 100 and tuned to monitor the control channel. In other words, the process of FIG. 6 returns to steps 100 and 101 and begins testing the control channel for the first bit pattern indicating that channel assignment and talk group identification codes may follow. The process of FIG. 6 is summarized in FIG. 7 where blocks 103, 115, 120, 130, and 140 appear with their overall functions indicated but without the detailed steps of FIG. 6.

Although the described embodiment monitors the control channel between voice transmissions, in an alternative embodiment, the control channel may be monitored continuously. For example, the receiver 2 of FIG. 1 may include two monitoring circuits: a control channel monitoring circuit and a voice channel monitoring circuit. The control channel monitoring circuit monitors the control channel continuously, and the voice channel monitoring circuit is tuned in frequency upon receiving a new working channel assignment from the control channel through the control channel monitoring circuit for a talk group being monitored. By continuously monitoring the control channel, a priority reception system can be implemented. By continuously decoding channel assignment and talk group identification codes, the identification codes can be compared to a prioritized list of talk group identification codes. When the talk group identification code of a talk group having a higher priority than the talk group currently being heard is detected, the computer retunes the receiver, even in the midst of a voice communication, to the channel of the higher priority communication. In this embodiment of the invention, once the control channel frequency is established, the control channel monitoring circuit is not changed from a fixed channel.

A preferred embodiment of a receiver control process according to this embodiment of the invention uses the same steps as in the flow chart of FIG. 6. In addition, in block 140, after test 135, a test is made, based upon a priority list of talk groups of interest, as to whether a newly identified talk group has a higher priority than the talk group currently being monitored, if any. If the talk group corresponding to the talk group identification code just decoded is of lower priority than the talk group currently being monitored, i.e., for which a communication is currently being received, then the process reverts to step 102. Thus, the tuning of the voice channel monitoring circuit is maintained without change. However, if it is determined that the most recently decoded talk group identification code represents a talk group having a higher priority than the talk group currently being monitored by the voice channel monitoring circuit, the process moves to step 141 as if no talk group were presently being monitored. The voice channel communication circuit is newly tuned to the channel indicated in the frequency map based upon the newly extracted channel assignment code in step 142. Thus, the voice channel communication receiver immediately changes to the higher priority voice channel, even in the course of monitoring another, lower priority voice communication for another talk group on a different channel. The voice channel monitoring circuit remains tuned to the higher priority communication until interrupted by a still higher priority communication or until the current communication ends as detected in test 144 or test 145. Upon loss of a signal of interest or detection of an end-of-transmission data burst, the talk group identification code being monitored is reset to a default value, i.e., the talk group of lowest priority. Then, the process reverts to the step 102.

Recent channel assignment and update messages are preferably displayed to the user, including talk group and channel identification codes, on the display 5. This feature enables a user to identify which talk groups are currently communicating and to control the receiver to monitor a specific talk group.

Although the foregoing description refers to changing the frequency monitored by the receiver or, when two receivers are employed, a voice channel monitoring circuit, "tuning" encompasses frequency "selection". In the more complex system described here and in still more complex systems according to the invention and including more than two receivers, "tuning" may be achieved by "selecting" an appropriate receiver. In other words, "tuning" would encompass a selection or switching process of choosing between numerous receivers tuned to particular channels. As used here, the term "tuning" encompasses both conventional frequency changing of a single receiver and selecting one of several fixedly tuned receivers in each of the various processes for monitoring communications in a trunked communication system.

The present system has an advantage over the transceivers that participate in trunked communications by passively monitoring trunked communications. In other words, embodiments of the present invention are able to follow a trunked radio communication from beginning to end without being subject to system commands and without using unnecessary information or circuitry. There are no transmissions, no hand-shaking protocols, no confirmations, or other interactive steps. Passive monitoring is based solely on receiving, storing, and analyzing control channel information. By contrast, transceivers actively participating in a trunked communications system, for example, in the GE/Ericsson system, are unable to monitor communications unless they are enabled by the control unit to participate in the communication. Only members of a called talk group are able to monitor a communication designating that talk group. All other received signals are rejected by a participating transceiver.

The invention provides a simple way to monitor trunked radio communications. Using a receiver, decoding control channel data, and, in response, controlling the tuning of the receiver, the invention passively and reliably monitors a trunked radio communication despite changes in frequency during communications. Such a system has not previously been available.

Although the invention has been described with respect to certain preferred embodiments, modifications and additions within the spirit of the invention will occur to those of skill in the art. Therefore, the scope of the invention is not limited by the foregoing description but is defined solely by the following claims.

We claim:

1. A method of monitoring communications in a trunked communication system in which digital messages incorporating a talk group identification code, identifying a talk group, and a channel assignment code, identifying a frequency on which a voice communication within the talk group takes place, are transmitted over a control channel and voice communications are transmitted over working channels that change between communications, the method comprising:

with a frequency tunable receiver, monitoring digital messages on a control channel to detect a first bit pattern in the digital messages;

upon detection of the first bit pattern in a digital message, storing data subsequently transmitted on the control channel;

extracting information from the stored data and analyzing the extracted information to obtain a channel assignment code and a talk group identification code;

comparing the talk group identification code obtained from the stored data to talk group identification codes of interest and, if the talk group identification code obtained from the stored data is a talk group identification code of interest, tuning the receiver to a working channel corresponding to the channel assignment code obtained from the stored data; and monitoring voice transmissions on the working channel.

2. The method of claim 1 including, upon detection of the first bit pattern, before storing the data subsequently transmitted, monitoring the control channel to detect a second bit pattern and storing data transmitted on the control channel only after detection of the second bit pattern, and, upon failure to detect the second bit pattern, resuming monitoring of the control channel for the first bit pattern.

3. The method of claim 1 including monitoring the control channel to detect the first bit pattern and, upon failure to detect the first bit pattern, tuning the receiver to a different control channel.

4. The method of claim 1 including, upon comparing the talk group identification code obtained from the stored data to the talk group identification codes of interest, if the talk group identification code obtained from the stored data is not a talk group identification code of interest, resuming monitoring of the control channel for the first bit pattern.

5. The method of claim 1 including, after tuning the receiver to the working channel, detecting absence of transmissions on the working channel, and, in response, tuning the receiver to the control channel for resuming monitoring of the control channel for the first bit pattern.

6. The method of claim 1 including detecting on the working channel an end-of-transmission signal indicating ending of voice transmissions on the working channel, and, in response, tuning the receiver to the control channel for resuming monitoring of the control channel for the first bit pattern.

7. An apparatus for monitoring communications in a trunked communication system in which digital messages incorporating a talk group identification code, identifying a talk group, and a channel assignment code, identifying a frequency on which a voice communication within the talk group takes place, are transmitted over a control channel and voice communications are transmitted over working channels that change between communications, the apparatus comprising:

a receiver tunable in frequency for monitoring digital messages on a control channel and voice communications on a plurality of working channels;

a demodulator for demodulating the digital messages received by the receiver on the control channel and producing demodulated signals;

a detector for detecting a first bit pattern in the demodulated signals;

a first memory for storing demodulated signals transmitted on the control channel subsequent to transmission of the first bit pattern;

analyzing means for extracting information from demodulated signals stored in the first memory to obtain a channel assignment code and a talk group identification code;

a second memory for storing talk group identification codes of interest;

comparing means for comparing the talk group identification code obtained from the demodulated signals stored in the first memory to the talk group identification codes of interest stored in the second memory and for generating an indication if the talk group identification code extracted from the demodulated signals stored in the first memory matches a talk group identification code of interest; and tuning means for tuning the receiver to a working channel corresponding to the channel assignment code obtained from the demodulated signals stored in the first memory when the comparing means indicates that the talk group identification code obtained from the demodulated signals stored in the first memory is a talk group identification code of interest.

8. The apparatus of claim 7 wherein the detector includes means for detecting absence of a demodulated signal and for indicating the absence of the demodulated signal, and the tuning means includes means for responding to the indication of the absence of the demodulated signal by tuning the receiver to a different control channel.

9. The apparatus of claim 7 including means for detecting the absence of transmissions on the working channel when the receiver is tuned to the working channel and for providing an indication of the absence of transmissions on the working channel, and the tuning means includes means for tuning the receiver to the control channel in response to the indication of the absence of transmissions on the working channel.

10. The apparatus of claim 7 including means for detecting an end-of-transmission signal transmitted on the working channel while the receiver is tuned to the working channel and for providing an indication of detection of the end-of-transmission signal, and the tuning means includes means for tuning the receiver to the control channel in response to the indication of detection of the end-of-transmission signal.

11. A method of monitoring communications in a trunked communication system in which digital messages, incorporating a talk group identification code, identifying a talk group, and a channel assignment code, identifying a frequency on which a voice communication within the talk group takes place, are transmitted over a control channel and voice communications are transmitted over working channels that change between communications, the method comprising:

with a frequency tunable control channel receiver, monitoring digital message on a control channel to detect a first bit pattern in the digital transmissions;

upon initial detection of the first bit pattern in a digital messages, storing data subsequently transmitted on the control channel;

extracting information from the stored data and analyzing the extracted information to obtain a channel assignment code and a talk group identification code;

comparing the talk group identification code obtained from the stored data to a prioritized list of talk group identification codes of interest and, if the talk group identification code obtained from the stored data is a talk group identification code of interest, tuning a voice channel receiver to a working channel corresponding to the channel assignment code and monitoring subsequent voice transmissions;

storing the talk group identification code of the working channel to which the voice channel receiver is tuned as the stored talk group identification code;

while monitoring voice transmissions on the voice channel receiver, continuing to monitor with the control channel receiver digital messages on the control channel for detecting the first bit pattern;

while monitoring voice transmissions on the voice channel receiver, upon detecting with the control channel receiver the first bit pattern in a digital messages, storing data subsequently transmitted on the control channel;

extracting information from the stored data and analyzing the extracted information to obtain a new channel assignment code and a new talk group identification code, comparing the new talk group identification code to the prioritized list of talk group identification codes of interest and to the stored talk group identification code and, if the new talk group identification code is a talk group identification code of interest and has a higher priority than the stored talk group identification code, tuning the voice channel receiver to the working channel corresponding to the new channel assignment code and storing the new talk group identification code as the stored talk group identification code; and monitoring voice transmissions with the voice channel receiver tuned to the working channel corresponding to the new channel assignment code while continuing to monitor the digital transmissions on the control channel with the control channel receiver for the first bit pattern.

12. The method of claim 11 wherein, if upon comparing the new talk group identification code to the stored talk group identification code and the prioritized list of talk group identification codes of interest, the new talk group identification code is a talk group identification code of interest and the stored talk group identification code has a priority higher than the new talk group identification code, keeping the voice channel receiver tuned to the working channel corresponding to the stored talk group identification code and continuing to monitor the control channel with the control channel receiver for the first bit pattern.

13. The method of claim 11 including, upon detection of the first bit pattern, before storing the data subsequently transmitted, monitoring the control channel to detect a second bit pattern and storing data transmitted on the control channel only after detection of the second bit pattern, and, upon failure to detect the second bit pattern, resuming monitoring of the control channel for the first bit pattern.

14. The method of claim 11 including monitoring the control channel with the control channel receiver to detect transmitted data and, upon failure to detect transmitted data, tuning the control channel receiver to a different control channel.

15. An apparatus for monitoring communications in a trunked communication system in which digital messages incorporating a talk group identification code, identifying a talk group, and a channel assignment code, identifying a frequency on which a voice communication within the talk group takes place, are transmitted over a control channel and voice communications are transmitted over working channels that change between communications, the apparatus comprising:

a control channel receiver tunable in frequency for monitoring digital messages on a control channel;

a voice channel receiver tunable in frequency for monitoring voice communications on a plurality of working channels;

a demodulator for demodulating the digital control signals received by the control channel receiver on the control channel and producing demodulated signals;

a detector for detecting a first bit pattern in the demodulated signals;

a first memory for storing demodulated signals transmitted on the control channel subsequent to transmission of the first bit pattern;

analyzing means for extracting information from demodulated signals stored in the first memory to obtain a channel assignment code and a talk group identification code;

a second memory for storing talk group identification codes of interest;

comparing means for comparing the talk group identification code obtained from the demodulated signals stored in the first memory to the talk group identification codes of interest stored in the second memory and for generating an indication if the talk group identification code extracted from the demodulated signals stored in the first memory matches a talk group identification code of interest; and first tuning means for tuning the voice channel receiver to a working channel corresponding to the channel assignment code obtained from the demodulated signals stored in the first memory when the comparing means indicates that the talk group identification code obtained from the demodulated signals stored in the first memory is a talk group identification code of interest.

16. The apparatus of claim 15 wherein the detector includes means for detecting absence of a demodulated signal and for indicating the absence of the demodulated signal, and the tuning means includes means for responding to the indication of the absence of the demodulated signal by tuning the control channel receiver to a different control channel.

17. The apparatus of claim 15 including a third memory storing the talk group identification code of the working channel to which the voice channel receiver is currently tuned, wherein a prioritized list of talk group identification codes of interest is stored in the second memory, and the comparing means comprises means for comparing the talk group identification code obtained from the demodulated signals stored in the first memory with the prioritized list of talk group identification codes of interest and with the talk group identification code stored in the third memory, and for generating an indication if the talk group identification code obtained from the demodulated signals stored in the first memory is a talk group identification of interest and is of a higher priority than the talk group identification code stored in the third memory and, only if so, tuning the voice channel receiver to the working channel corresponding to the channel assignment code obtained from the demodulated signals stored in the first memory.

\* \* \* \* \*